United States Patent [19]

Bates

[11] Patent Number: 5,003,735
[45] Date of Patent: Apr. 2, 1991

[54] MARKER SCREW CAP

[76] Inventor: James H. Bates, 8809 Youngdale, San Gabriel, Calif. 91775

[21] Appl. No.: 446,075

[22] Filed: Dec. 5, 1989

[51] Int. Cl.⁵ .......................... E04B 1/00; F16L 55/00
[52] U.S. Cl. ...................... 52/105; 138/104; 138/96 R; 52/221; 116/209; 285/93
[58] Field of Search ................ 52/105, 704, 301, 220, 52/221; 116/209; 138/96 R, 104; 285/93

[56]  References Cited
U.S. PATENT DOCUMENTS

| 966,086 | 8/1910 | Faile | 52/221 |
|---|---|---|---|
| 1,956,879 | 5/1934 | Sharp | 52/221 |
| 2,210,441 | 8/1940 | Bachman | 52/704 |
| 2,764,886 | 10/1956 | Wiesmann | 52/221 |
| 2,975,559 | 3/1961 | Hedgren | 52/221 |
| 3,030,256 | 4/1962 | Rosenthal | 428/95 |
| 3,166,631 | 1/1965 | Reiland | 52/221 |
| 3,373,535 | 3/1968 | Lankes | 52/105 |
| 4,915,055 | 4/1990 | Ptashinski | 138/104 |

Primary Examiner—James L. Ridgill, Jr.
Attorney, Agent, or Firm—Eric P. Schellin

[57]  ABSTRACT

A device for locating a marker screw threadably engaged with a cover in duct means imbedded in a poured concrete wall construction including resilient fibers that are attached to the marker screw at one end and project beyond the outer wall surface but resiliently yield upon engaging with a finishing tool thus facilitating location of said marker screw after the wall has been poured.

4 Claims, 1 Drawing Sheet

MARKER SCREW CAP

FIELD OF THE INVENTION

The present invention relates to improvements in poured wall construction and more particularly to a new and improved device for locating a marker screw, which has one end adapted to be threadably engaged with a duct outlet cover. The device includes resilient fibers that extend outwardly from the duct toward an outer surface of the wall during and after pouring of the wall to embed the duct.

It is common practice in the building trade to employ concealed under floor wire duct systems for housing wiring for supplying different kinds of electrical services at various locations or regions of the floor area. Wiring for supplying electric current of suitable voltage for the energization of motorized equipment, wiring for supplying low voltage electric current for energizing interoffice communication or call systems and telephone wiring, are conventionally carried by concealed under floor of wiring duct systems.

Standard stack lengths of tubular duct having access openings and corresponding tubular inserts or fittings together with a marker screw are described in U.S. Pat. No. 3,061,663 for example.

The instant invention is particularly adapted for use in locating potential electrical outlets in the duct embedded in poured wall construction. Taking a poured concrete floor wall as example, it is convention practice to first lay the ducts along the subflooring of other support. At intervals along its length the duct has openings for outlets in its upper wall which are closed by covers on which an upstanding marker screw is threadably mounted. In order to make pouring of the floor the desired height and finishing of the upper surface of the floor, while maintaining location of various marker screws, it is necessary that the position of the heads of the screw be marked so that the covers can be removed after the floor has been poured.

U.S. Pat. No. 2,975,599 to Hedgren describes a wire distribution cellular metal floor; U.S Pat. No. 2,764,886 to describes an identification device for the wiring cells of a floor. U.S. Pat. No. 3,373,535 describes a marker screw cap and U.S. Pat. No. 3,166,631 describes an under floor duct with particularly spaced access openings.

OBJECTS OF THE INVENTION

It as a primary object of the instant invention to provide a marker screw which permits rough or haphazard positioning of the marker screw to any suitable height below the surface of the poured wall while still locating the screw during and after the pouring of the wall without interfering with the finishing of the outer surface.

Another object of the invention is to provide a marker device which is adapted to project outwardly beyond the outer surface of the poured wall not only for locating of the screw but also resiliently yielding upon engagement by means employed in finishing the outer surface.

Another object of the invention is to provide a device which is economical to manufacture and both efficient and effective in serving the purposes for which it is designed.

Additional objects and advantages of the invention become apparent upon consideration of the following detailed description and the accompanying drawings.

DETAILED DESCRIPTION OF THE DRAWINGS

Figure 1:
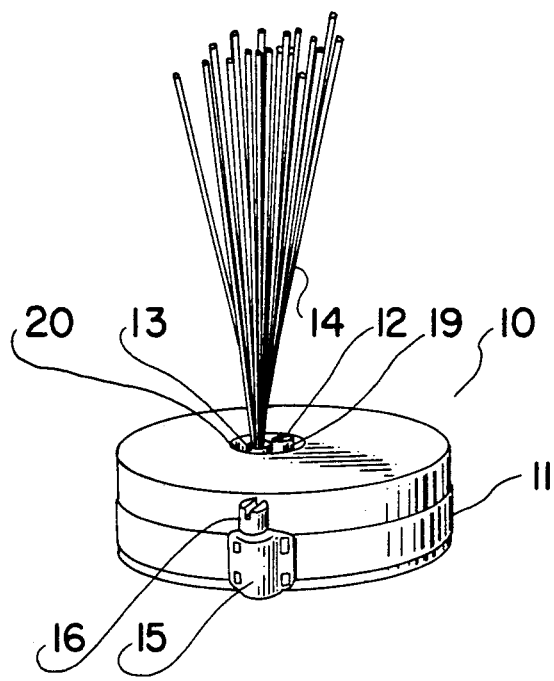
FIG. 1 is a perspective view of the marker screw structure constituting a preferred embodiment of the invention.

Referring now to FIG. 1 which shows a preferred embodiment of the invention, a duct outlet cover (10) which is made of a resilient elastomeric material such as hard rubber. The cover includes a metal band 11 that can be adjusted in size by the member 15 and the tightening screw 16. The marker screw 12 is positioned in the approximate center in a recess 20 of the cover 10 and has a band 19 positioned near its top. The band includes a circular holder 13 for holding the resilient fibers 14.

Figure 2:
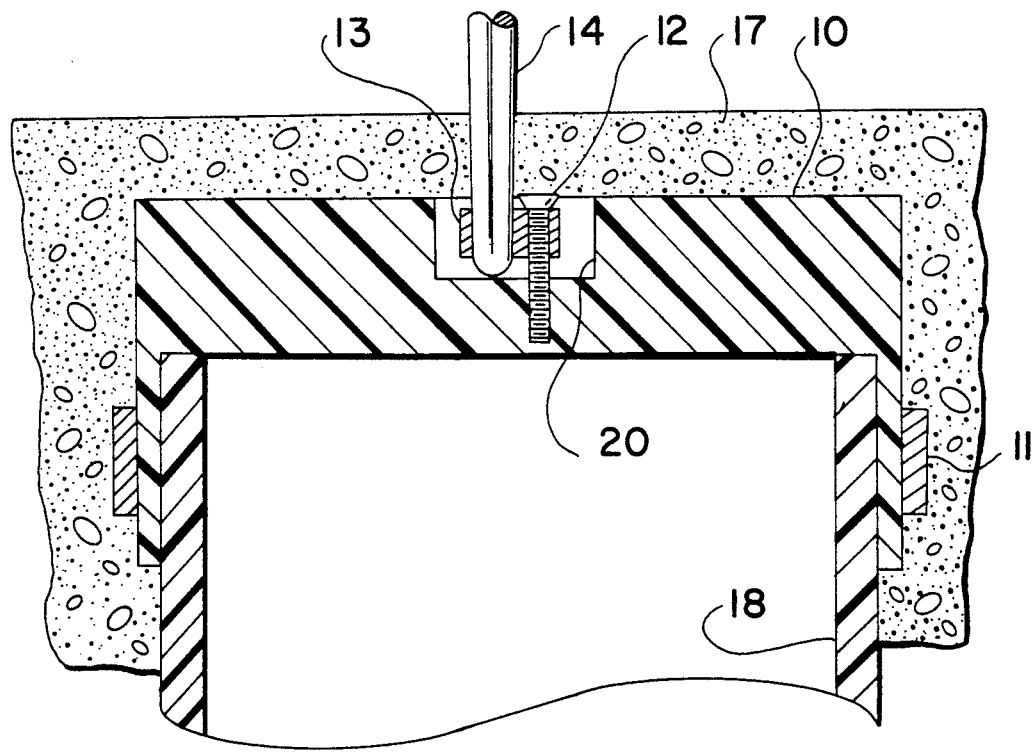
FIG. 2 is a vertical section through a poured wall showing the marker screw adjusted to a convenient height with the resilient fibers projecting above the top surface of the floor.

A typical poured concrete floor construction is shown in FIG. 2 includes an elongated hollow rectangular metal duct shown in cross-section at 18, for receiving electrical supply wires and the like (not shown) and having a series of longitudinally spaced upper outlets covered by covers 10. The adjustment band is shown at 11 and the marker screw is shown in crosssection at 12 with the fiber holder 13. Large diameter nylon fibers positioned in the holder 13 are shown at 14.

In forming the poured floor wall construction is shown in FIG. 2 the duct 18 is laid out on the subfloor with other support (not shown) but its upper outlets closed by a cover 10. The screw 12 is threadably attached to the cover 10. There is no need for precise adjustment of the height of the screw 12 because the projecting fibers 14 extend outwardly from the cover through the outer surface of the wall to be poured.

After the wall 17 has set the resilient fibers 14 protrude above the wall of floor 17 to indicate the position of the marker screw 12. It is a simple matter to chip away the concrete portions whereupon the height of the screw can be readily adjusted to that desired in the wall or floor 17.

Now that we have seen how the invention encompasses various objects the numerous advantageous of the invention likewise will be evident. While the invention has described and illustrated herein by references showing preferred embodiment, it is to be understood that various changed and modifications may be made in the invention by those skilled in the art without departing from the inventive concept, the scope of which is to be determined by the appended claims.

What is claimed is:

1. A device locating a marker screw which has one end threadably engaged within a recess in a cover of an outlet in a duct and which is adapted to extend outwardly from the cover toward an outer surface of a wall or floor, during and after pouring of the wall or floor to embed the duct means, the other end of said marker screw adapted to be roughly adjusted below the outer surface, said device comprising a tubular holder attached to said marker screw, elongated resilient fibers positioned and connected at one end in said tubular holder with their other end projecting outwardly beyond the outer surface of the poured wall or floor, for resiliently yielding and temporarily bending over upon engagement by means employed in finishing said outer surface, thus facilitating location of said marker screw after the wall or floor has been poured.

2. The device according to claim 1 wherein said holder is connected to said marker screw by means of a clamp.

3. The device according to claim 2 wherein said clamp surrounds said locator screw and also encloses said holder containing an elongated tuft of resilient fibers.

4. The device according to claim 2 wherein said tuft of resilient fibers is a tuft of colored nylon fibers.

* * * * *